J. I. BURR.
PRESERVING KETTLES.

No. 193,804. Patented Aug. 7, 1877.

UNITED STATES PATENT OFFICE.

JOHN I. BURR, OF PHILADELPHIA, PENNSYLVANIA, ASSIGNOR TO THE BARROWS SAVERY COMPANY, (LIMITED,) OF SAME PLACE.

IMPROVEMENT IN PRESERVING-KETTLES.

Specification forming part of Letters Patent No. 193,804, dated August 7, 1877; application filed March 20, 1877.

*To all whom it may concern:*

Be it known that I, JOHN I. BURR, of the city and county of Philadelphia, State of Pennsylvania, have invented certain new and useful Improvements in Preserving - Kettles; and I do hereby declare that the following is a sufficiently full, clear, and exact description thereof to enable persons skilled in the art to make and use the same.

The nature of my invention consists in forming upon a preserving-kettle provided with a bail, hinged or otherwise flexibly attached or jointed thereto, a lip or spout for pouring, and opposite to the lip or spout a handle, for the purpose of tilting the kettle when suspended by the bail and pouring from the spout, which handle is looped, for a twofold purpose—first, to afford a better hold in tilting the kettle, and, second, to expose such a large part of its surface for radiation of heat relatively to the small section at its points of junction with the body of the kettle that it will not become inconveniently hot to the hand; and the spout and handle are both so proportioned as to support the bail when not raised, and thus prevent the bail from becoming heated by contact with the body of the kettle. Such kettles, from their form, can be easily enameled or tinned, and compactly and safely nested for transportation.

I will now proceed to more particularly describe my invention, referring, in so doing, to the drawings annexed, and forming a part of this specification, and the letters of reference marked thereon.

Figure 1:
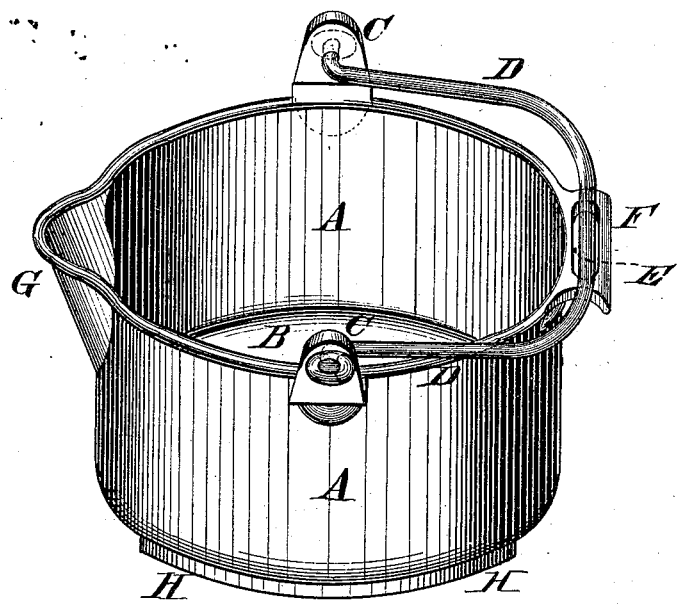
Figure 2:
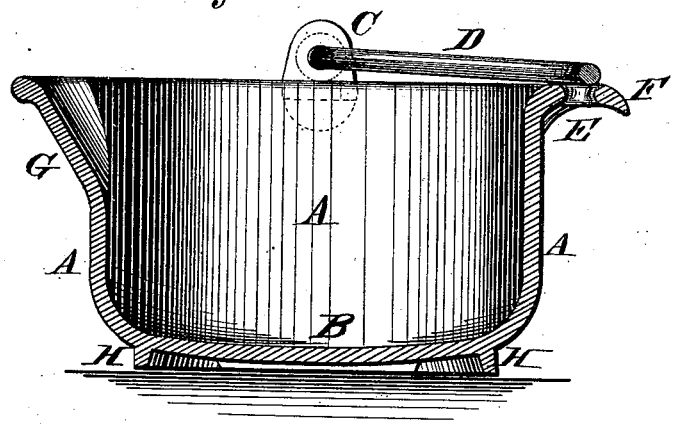

Figure 1 is a perspective view of a kettle, and Fig. 2 a vertical section.

A represents the body of the kettle, having a convex bottom, B, ears C C, and a bail, D, a handle, F, formed preferably with an opening, E, between it and the kettle-rim. Midway in the rim between the ears C C, and directly opposite the handle F, a spout or lip, G, is formed.

The proportions of the bail D, handle F, and spout G are such that while the bail is so large as not to rest on the rim of the kettle, it is prevented from falling in contact with the sides of the kettle by resting upon the handle F and spout or lip G. By this means the bail rarely becomes heated when the kettle is in use upon the stove, is always in a position to be readily grasped, and not so liable to break the ears from the kettle as when the motion of the bail is restricted by stops placed on or near the ears.

I do not broadly claim a projection or handle on the rim of a kettle or other culinary vessel for the purpose of tilting the same when suspended by a bail; neither do I claim, broadly, a looped handle, such handles having been applied to the sides of such vessels below the rim. Such handles, thus attached, become heated, and fail to support the bail and insulate it from heat, and are, therefore, objectionable; but What I do claim is—

The kettle provided with a slotted handle, F, and spout G, both formed on the rim, and combined with the pivoted or swinging bail D, as and for the purpose set forth.

JOHN I. BURR.

Witnesses:
J. DANIEL EBY,
HENRY J. HAND.